United States Patent [19]

Tomita et al.

[11] 4,409,721
[45] Oct. 18, 1983

[54] MACHINE TOOL WITH AUTOMATIC TOOL CHANGE FUNCTION

[75] Inventors: Tamaki Tomita, Okazaki; Kenichi Munekata, Kariya; Fumihiko Ohkoshi, Anjo; Toshifumi Hasegawa, Kariya, all of Japan

[73] Assignee: Toyoda Koki Kabushiki Kaisha, Kariya, Japan

[21] Appl. No.: 322,271

[22] Filed: Nov. 17, 1981

[30] Foreign Application Priority Data

Nov. 21, 1980 [JP] Japan .................. 55/164806

[51] Int. Cl.³ .................................. B23Q 3/157
[52] U.S. Cl. ....................... 29/568; 279/1 TS;
                                   409/232; 409/233
[58] Field of Search .............. 29/568, 26 A; 409/233,
                            409/232, 231, 234; 279/1 TS

[56] References Cited

U.S. PATENT DOCUMENTS

| | | | |
|---|---|---|---|
| 3,191,260 | 6/1965 | Jorgensen | 29/568 |
| 3,520,228 | 7/1970 | Wohlfeil | 29/568 X |
| 3,851,562 | 12/1974 | Tomita | 29/568 X |
| 4,008,647 | 2/1977 | Hague | 409/233 X |
| 4,172,683 | 10/1979 | Shimauiri | 409/233 |
| 4,356,621 | 11/1982 | Tomita et al. | 29/568 |

FOREIGN PATENT DOCUMENTS

| | | | |
|---|---|---|---|
| 55-90242 | 7/1980 | Japan | 29/568 |
| 659294 | 4/1979 | U.S.S.R. | 409/233 |
| 742047 | 7/1980 | U.S.S.R. | 409/233 |

*Primary Examiner*—William R. Briggs
*Attorney, Agent, or Firm*—Oblon, Fisher, Spivak, McClelland & Maier

[57] ABSTRACT

A machine tool with an automatic tool change function wherein a rotatable tool spindle carries a movable key engageable with either of a pair of key-ways formed on a tool. A tool changing arm, serving as a tool support device, friction-rotatably supports at least one tool for being selectively inserted within and removed from the tool spindle. When tool changing operation is to be performed, rotation of the spindle is changed to a predetermined speed permitting key-engagement. A first confirming device is provided for confirming the fact that the spindle has reached a first predetermined position during rotation thereof. The tool change arm is then operated to remove the tool from the spindle in response to the first confirming device. A second confirming device is provided for confirming that the spindle has reached a second predetermined position during rotation thereof. Prior to insertion of the tool into the spindle, the movable key is withdrawn, and in response to the second confirming device the movable key is moved outwardly into engagement with the predetermined key-way of the first and second key-ways.

4 Claims, 7 Drawing Figures

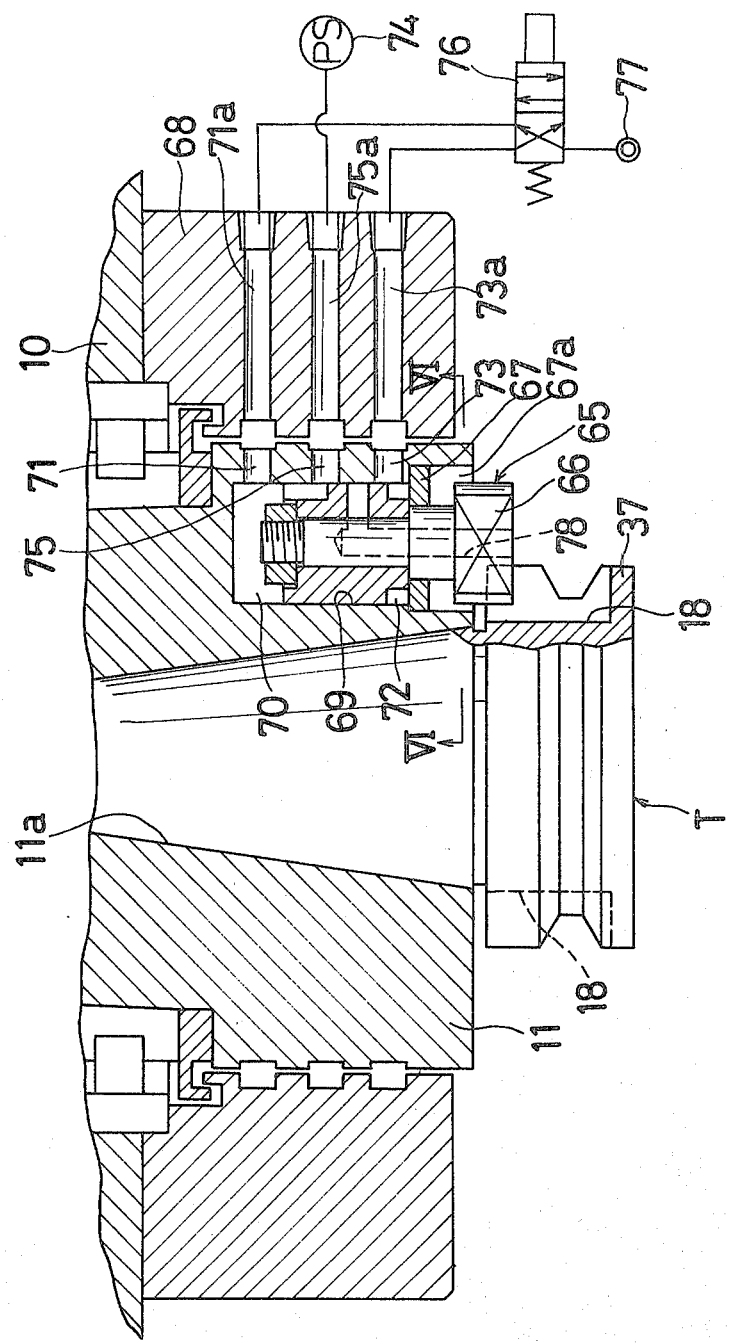

MACHINE TOOL WITH AUTOMATIC TOOL CHANGE FUNCTION

BACKGROUND OF THE INVENTION

1. Field of the Invention

The present invention relates to a machine tool with an automatic tool change function, which is capable of making engagement between a key of a tool spindle and a key-way of a tool or a tool holder without stopping rotation of the spindle.

2. Description of the Prior Art

Conventionally, in order to allow for engagement between a key of a tool spindle and a key-way of a tool, the spindle is stopped at a predetermined angular position, which results in a longer time period for tool change operation.

Accordingly, it is extremely effective to perform a tool change operation without stopping the spindle at the predetermined angular position for shortening the required time for tool changing operation. On the other hand, the tool is usually provided with two key-ways at diametrically opposite positions, and thus it is necessary to engage the key with one predetermined key-way of first and second key-ways for maintaining a constant taper engagement between the spindle and the tool.

SUMMARY OF THE INVENTION

It is an object of the present invention to provide an improved machine tool with an automatic tool changing function, wherein a key engagement is provided between a key-way of a tool and a movable key of the spindle without discontinuing rotation of a spindle.

Another object of the present invention is to provide an improved machine tool with an automatic tool change function of the character set forth above, wherein a taper engagement between the spindle and the tool is continuously maintained by engaging the movable key with predetermined key-way of first and second key-ways of the tool.

Briefly, according to the present invention, these and other objects are achieved by providing a machine tool with an automatic tool change function having a tool spindle rotatably supported and capable of receiving a tool at one end thereof, as mentioned below. A tool support mechanism is provided for rotatably supporting at least one tool to selectively insert the same within and remove the same from the tool spindle. A movable key is movably guided in the spindle and has a width smaller than that of a pair of key-ways formed on the tool. A control mechanism is responsive to a tool change command for rotating the spindle at a predetermined speed permitting key-engagement. An operating mechanism causes relative movement between the tool support mechanism and the spindle for tool change operation with the spindle being rotated at the predetermined speed. A first mechanism is provided for confirming that the spindle reaches a first predetermined position during rotation thereof at the predetermined speed. A second mechanism is provided for confirming that the spindle reaches a second predetermined position during rotation thereof at the predetermined speed. A third mechanism included in the operating mechanism is responsive to the first confirming mechanism for causing relative movement between the tool support mechanism and the spindle in a direction parallel to the axis of the spindle to remove the tool from the spindle. A fourth mechanism is provided for withdrawing the movable key prior to insertion of the tool into the spindle and for moving the movable key outwardly into engagement with a predetermined key-way of the first and second key-ways in response to the second confirming mechanism.

BRIEF DESCRIPTION OF THE DRAWINGS

The foregoing and other objects and many of the attendant advantages of the present invention will be readily appreciated as the same becomes better understood with reference to the following detailed description, when considered in connection with the accompanying drawings, in which:

FIG. 5 is an enlarged fragmentary sectional view of a spindle head showing a movable key and a key engagement confirming device;

DETAILED DESCRIPTION OF THE PREFERRED EMBODIMENT

Figure 1:
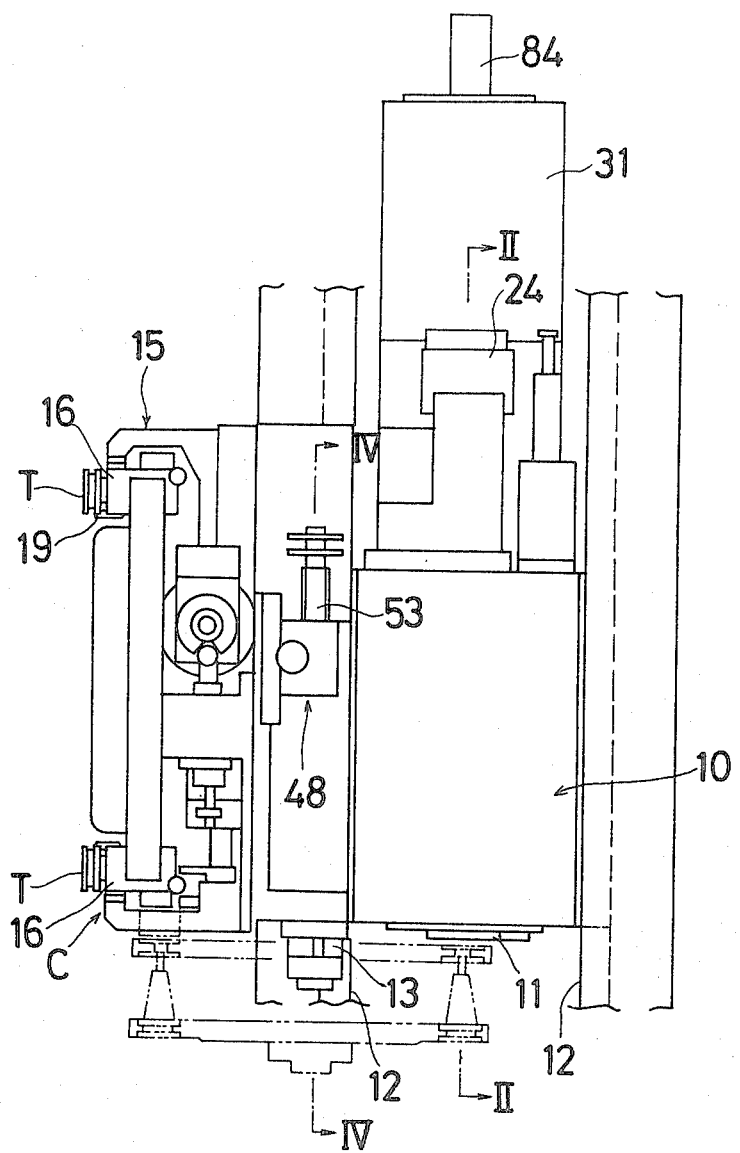
FIG. 1 is a front view showing a spindle head and an automatic tool change apparatus according to the present invention.

Referring now to the drawings, wherein like reference numerals or characters refer to identical or corresponding parts throughout the several views, and more particularly to FIG. 1, there is shown a spindle head 10 which is guided on guide ways 12 and 12 formed on an upstanding column (not shown) for vertical sliding movement and which rotatably supports a vertical spindle 11. FIG. 1 shows an upper end position of spindle head 10, where tool change operation is performed. Reference numeral 13 indicates a tool change arm having tool grippers at opposite ends thereof to serve as a tool support device. Tool change arm 13 is movable in a direction parallel to the axis of the spindle 11 and rotatable about a vertical axis. A tool magazine 15 is rotatably supported and carries a plurality of tool sockets 16 on the periphery thereof. Each tool socket 16 serves to removably support a tool T and is indexable to a tool change position C, where indexed tool socket 16 is pivotable from a horizontal position shown in solid lines to a vertical position shown in phantom lines for enabling tool change arm 13 to change tools between vertically oriented tool socket 16 and spindle 11. Each tool socket 16 on tool magazine 15 is provided with a detent pin 19 engageable with one of two key-ways 18 formed on each tool T with some play to restrict the direction of the tool T received in tool socket 16 within a predetermined angular extent.

Figure 2:
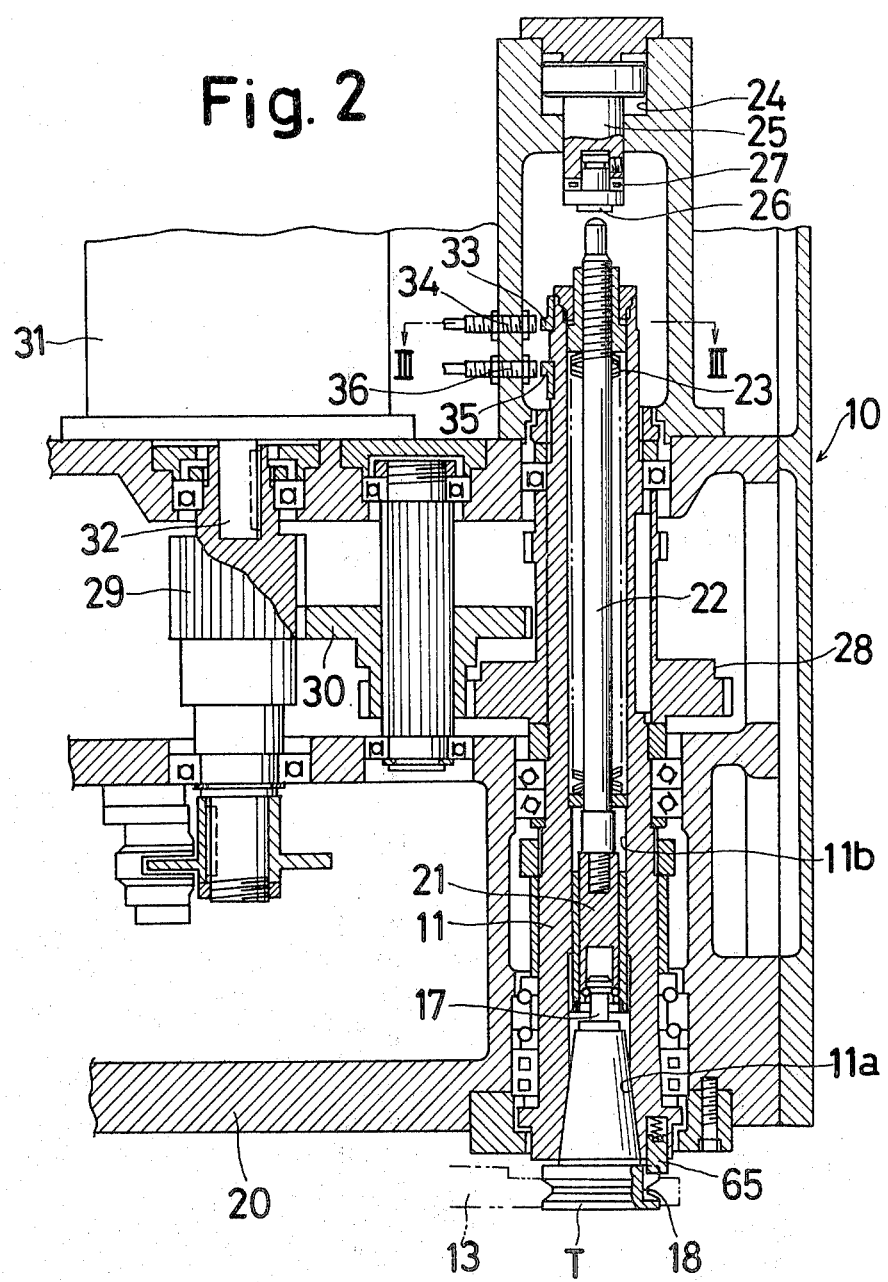
FIG. 2 is an enlarged sectional view taken along the lines II—II in FIG. 1.

Referring to FIG. 2 showing a detailed construction of spindle head 10, spindle 11 rotatably supported by a housing 20 is formed with a tool receiving tapered bore 11a at a lower end thereof and a through bore 11b connected to tapered bore 11a. Within through bore 11b are received a snap member 21 engageable with a pull stud 17 extended from one end of a tool T received in tapered bore 11a, a drawing rod 22 connected at a forward end portion thereof with snap member 21 and projecting at a rear end portion thereof from the rear end of the spindle 11, and a set of washer springs 23 drawing drawing rod 22 in a rearward direction relative to spindle 11, in such a manner as to constitute a clamping device for clamping the tool T relative to the spindle 11. In face to face relationship with the rear end of drawing rod 22 is disposed an unclamping cylinder 24 whose piston rod 25 rotatably supports an abutting member 26 at a forward end thereof through a thrust bearing 27. When drawing rod 22 is urged against springs 23 through abutting member 26, tool T in spindle 11 is unclamped. A gear member 28 is secured on spindle 11 and is connected through a shiftable transmission gear member 30 and a drive gear 99 to an output shaft 32 of a spindle drive motor 31 which is mounted on the upper end of spindle head 10. Drive motor 31 is driven at a speed depending upon a rotary speed command applied from a numerical control device NC and also at a predetermined low speed in response to a tool change command, as described later in greater detail.

Figure 3:
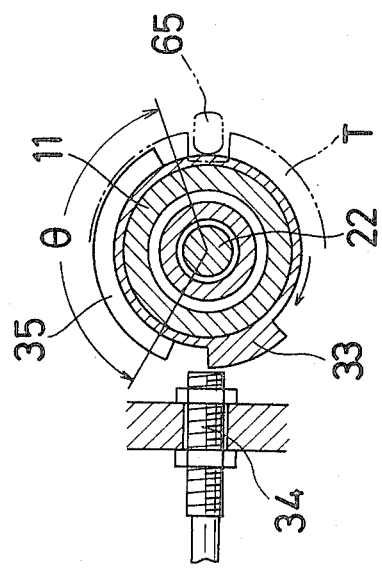
FIG. 3 is an enlarged sectional view taken along the lines III—III in FIG. 2.

At the rear end of the spindle 11 is secured a dog member 33 having a projection with a predetermined angular distance, as shown in FIGS. 2 and 3. A proximity switch 34 responsive to the projection of dog member 33 is provided on spindle head 10. When proximity switch 34 is changed from an ON to OFF state, such confirms that spindle 11 has reached a predetermined angular position during rotation thereof.

A dog member 35 having a projection with a predetermined angular distance $\theta$, where $\theta$ is smaller than 180 degrees, is also secured at the rear end of spindle 11 in juxtaposed relationship with dog member 33. A proximity switch 36 responsive to the projection of dog member 35 is provided on spindle head 10 so as to detect the angular range of spindle 11.

Figure 4:
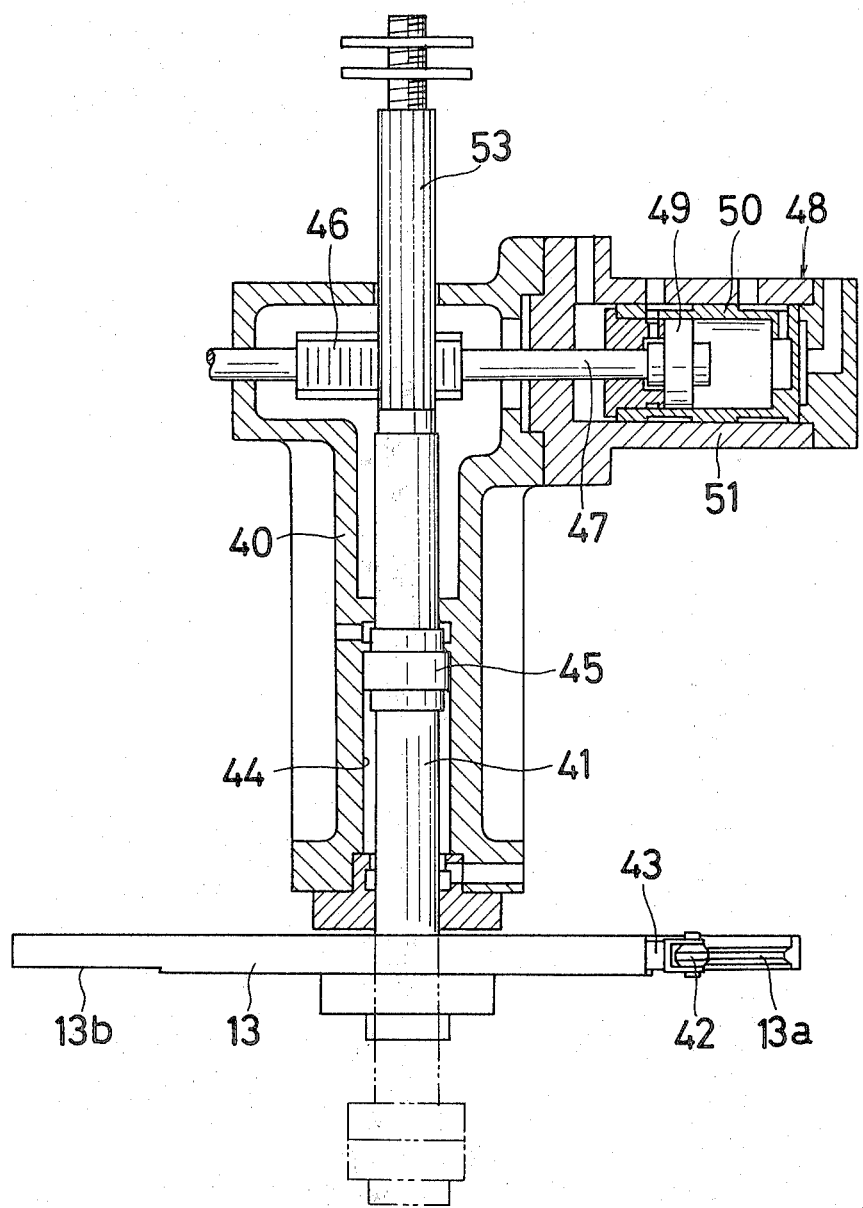
FIG. 4 is an enlarged sectional view taken along the lines IV—IV in FIG. 1.

Referring to FIG. 4 showing a detailed construction of tool change arm 13 and a drive device therefor, a support shaft 41 is rotatably and axially movably supported by a support body 40. Support shaft 41 has secured at a lower end thereof tool change arm 13 which is formed at opposite ends thereof with a pair of circular tool grippers 13a and 13b symmetrically disposed with respect to the axis of support shaft 41 and engageable with a flange portion 37 of each tool T. In order to prevent tool T from falling from tool gripper 13a or 13b, a plunger 43 rotatably supporting an engaging roller 42 at one end thereof is guided at each end of tool change arm 13 so as to be movable in a substantially radial direction and is urged outwardly by a spring (not shown). This spring is calibrated in such a manner that when tool change arm 13 is rotated to grip or release the tools T held in spindle 11 and tool socket 16 in its vertical position, plunger 43 is moved inwardly to allow gripping or release of tool T, and when the tools are held by tool grippers 13a and 13b of tool change arm 13, engaging roller 42 is urged toward tool T to prevent the tool from falling yet allow frictional rotation of the tool.

Support shaft 41 is formed at an intermediate portion thereof with a piston 45 slidably received in a cylinder 44 formed in support body 40. Selective supply of pressurized fluid into upper and lower cylinder chambers of cylinder 44 causes tool change arm 13 to be vertically moved to insert and withdraw tools T. Support shaft 41 is formed at its upper end with an elongated gear 53 in meshing engagement with a rack bar 46. Rack bar 46 is connected through a piston rod 47 with a piston 49 of a hydraulic cylinder 48 capable of being posiioned at four different positions. Piston 49 is slidably received in an inner cylinder 50 which is, in turn, slidably received in an outer cylinder 51. When inner cylinder 50 is moved relative to outer cylinder 51 with relative movement being restrained between piston 49 and inner cylinder 50, tool change arm 13 is rotated between a ready position shown in solid lines in FIG. 1 and a tool grip position shown in phantom lines to grasp or release the tools. When piston 49 is moved relative to inner cylinder 50 which is restrained from movement relative to outer cylinder 51 at a right or left end position thereof, tool change arm 13 is rotated 180 degrees to change the tools.

Figure 6:
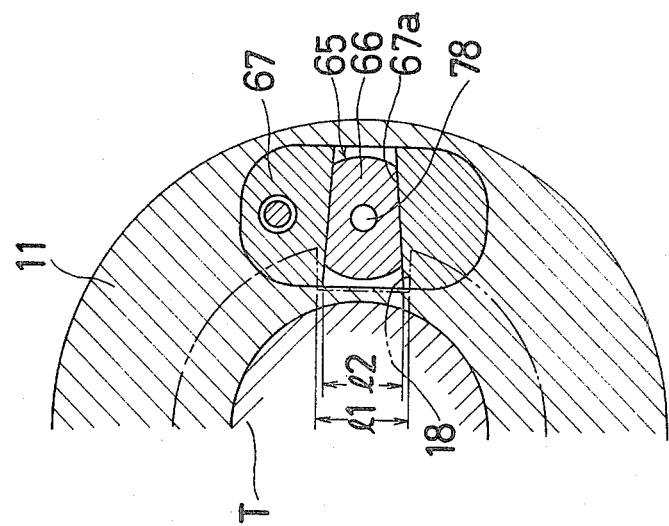
FIG. 6 is a sectional view taken along the lines VI—VI in FIG. 5.

Referring now to FIGS. 5 and 6, a movable key 65, engageable with each key-way 18 of a tool T to be inserted into spindle 11, is slidably received in a bore 69 formed at the front end of spindle 11. Movable key 65 includes at a front end portion thereof a flattened engaging head 66 whose width (l2) is narrower than that (l1) of key-way 18. Engaging head 66 projects beyond a plate member 67 secured to the front end of spindle 11. Plate member 67 is formed with an engaging recess 67a engaged with engaging head 66 of movable key 65 to prevent rotation of movable key 65 and to transmit rotational force to movable member 65 from spindle 11. The end surface of plate member 67 is engageable with the shoulder portion of movable key 65 to restrict forward movement of movable key 65. A rear chamber 70 formed between movable key 65 and the bottom end of bore 69 communicates with a solenoid valve 76 through passages 71 and 71a formed, respectively, on spindle 11 and a cover plate 68. A front chamber 72 formed between plate member 67 and movable key 65 communicates with solenoid valve 76 through passages 73 and 73a formed respectively on spindle 11 and cover plate 68. Solenoid valve 76 is connected to a pressurized air supply source 77. Rear chamber 70 also communicates with a pressure switch 74 through passages 75 and 75a formed, respectively, on spindle 11 and cover plate 68, when movable key 65 is in its projected position as shown in FIG. 5. Movable key 65 is formed with a passage 78 one end of which communicates with the outer periphery of movable key 65. The other end of passage 78 is open to atmosphere at the front end of movable key 65. When movably key 65 is moved inwardly by pressurized air supplied to front chamber 72, pressure switch 74 commuicates with passage 78 and thus with atmosphere. When movable key 65 is moved by pressurized air supplied to rear chamber 70 into a position shown in FIG. 5 as a result of engagement between key-way 18 of the tool T and movable key 65, communication between passages 75 and 78 is shut off, but communication between passages 71 and 75 is established, whereby pressurized air is applied to pressure switch 74 to confirm engagement between key-way 18 of tool T and movable key 65.

Figure 7:
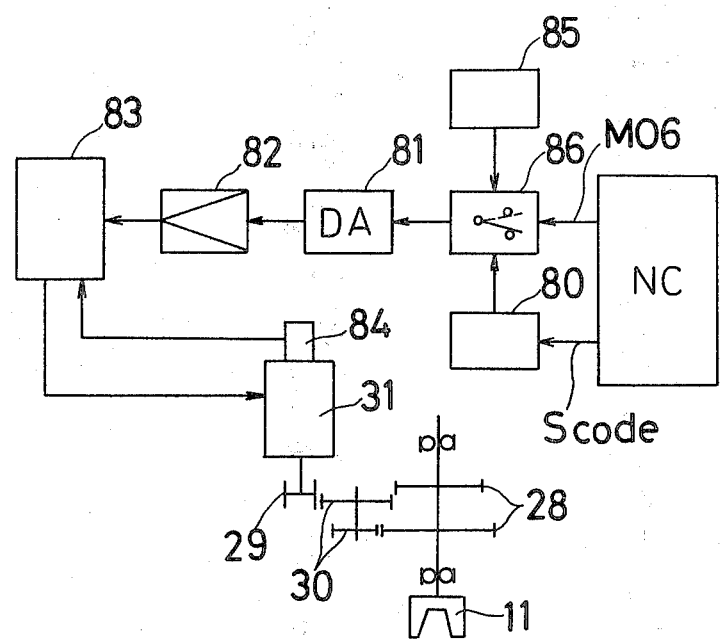
FIG. 7 is a block diagram showing an electric control circuit for controlling a spindle drive motor.

Referring now to FIG. 7, spindle drive motor 31 is controlled to be rotated at a speed depending upon any of the various tools inserted in spindle 11. When a rotational speed command (S-code) is applied from a numerical control device NC to a register 80, the speed command is converted by a digital to analog converter 81 into a corresponding voltage which is, in turn, applied as a speed command voltage to a motor drive circuit 83 through an amplifier 82. The actual rotational speed of drive motor 31 is detected by a speed detector 84, and the detected actual speed is fed back to motor drive circuit 83. Accordingly, the rotational speed of drive motor 31 is controlled in such a manner that the detected actual rotational speed becomes equal to the commanded rotational speed. When a d.c. motor is used as drive motor 31, a thyristor Leonard device is used as motor drive circuit 83. When an a.c. motor is used as drive motor 31, a variable frequency inverter device is used as motor drive circuit 83.

In order to perform a tool changing operation, it is necessary to reduce the rotational speed of spindle 11 from a speed depending upon any of various tools to a predetermined low speed such as several tens rpm. A setting device 85 for setting such predetermined low speed command is connected to digital to analog converter 81 through a switching circuit 86. When the numerical control device NC generates a tool change command M06, switching circuit 86 applies, instead of a rotational speed command set in register 80, the predetermined low speed command set in setting device 85 to digital to analog converter 81. As a result, motor drive circuit 83 controls the rotation of motor 31 so as to rotate spindle 11 at the set low speed. When the engagement between key-way 18 of tool T and movable key 65 is confirmed by pressure switch 74, switching circuit 86 is switched over to cause a rotational speed command set in register 80 to be applied to digital to analog converter 81, whereby spindle 11 is rotated at a speed depending upon the particular tool T inserted therein.

It is to be noted here that tool T grasped by tool gripper 13a or 13b of tool change arm 13 can be forcibly rotated, but is not rotated together with movable key 65 abutting the end surface of flange portion 37 of tool T, since tool T is gripped by tool gripper 13a or 13b with a frictional force greater than that caused between tool T movable key 65 abutting the end surface of flange portion 37 of tool T. Tool T is rotated only when engagement between key-way 18 of tool T and movable key 65 is established.

The operation of the machine tool with an automatic tool change function according to the present invention will now be described. Spindle 11 is usually rotated within a wide range from 20 to 3,000 rpm, and shiftable gear 30 is operated intermediate such range to change the reduction gear ratio. For example, shiftable gear 30 is shifted to a low speed range when the rotational speed is lower than 1,100 rpm, and to a high speed range when the rotational speed is higher than 1,100 rpm. Accordingly, the frequency of use at the low speed range is higher in usual machining operations, so that shiftable gear 30 is hereunder assumed to be shifted to the low speed range for convenience of description.

Upon completion of a machining operation by a predetermined tool, spindle 11 continues to rotate at a high speed depending upon a rotational speed command set in register 80. Spindle head 10 is moved upwardly to an upper end portion thereof for tool change operation. When tool change command M06 is generated from numerical control device NC, switching circuit 86 is changed over to apply a rotational speed command set in setting device 85. Accordingly, drive motor 31 applies an electrical braking torque so as to rotate spindle 11 at a predetermined low speed suitable for key engagement. Thereafter, tool change arm 13 is rotated to grip by tool grippers 13a and 13b thereof and tools T are held in vertically oriented tool socket 16 and spindle 11. Unclamping cylinder 24 is subsequently operated to move drawing rod 22 downwardly against springs 23, thereby unclamping tool T held in spindle 11. When spindle 11 is rotated to a predetermined position shown in FIG. 3, where proximity switch 34 is changed from the OFF to the ON state, pressurized fluid is supplied to the upper chamber of cylinder 44 to move tool change arm 13 downwardly thereby withdrawing tools T from spindle 11 and tool socket 16. Key-way 18 of tool T is disengaged from movable key 65 of spindle 11 by such withdrawal of tool T from spindle 11, whereby rotation of tool T withdrawn from spindle 11 is immediately stopped by gripping force of tool change arm 13. Accordingly, key-way 18 of tool T grasped by tool change arm 13 is maintained at a substantially predetermined angular position.

When tool change arm 13 is moved to a lower end position thereof, piston 49 is moved, with movement of inner cylinder 50 being restrained, to rotate tool change arm 13 by 180 degrees. Subsequently, pressurized fluid is supplied to the lower chamber of cylinder 44 to move tool change arm 13 upwardly, whereby tool T withdrawn from tool socket 16 is inserted into tapered bore 11a of spindle 11, while the tool withdrawn from spindle 11 is inserted into tool socket 16. In this manner, since tool T is withdrawn from spindle 11 at such time as spindle 11 is rotated into the predetermined angular position, tool T is returned to tool socket 16 in such a manner that key-way 18 of tool T is engaged with detent pin 19 of tool socket 16 with some play being provided.

Prior to the insertion of tool T into tapered bore 11a of spindle 11, solenoid valve 76 is changed over to supply pressurized air into front chamber 72, thereby retracting movable key 65. Under these conditions, when tool T is inserted into spindle 11, the flange portion of tool T faces movable key 65 being rotated together with spindle 11. When movable key 65 passes over one of key-ways 18 being prohibited from engaging with movable key 65, proximity switch 36 is actuated by dog 35 to change over solenoid valve 76 into the position shown in FIG. 5, whereby pressurized air is supplied to rear chamber 70 to move movable key 65 outwardly into sliding engagement with flange portion of tool T. When movable key 65 is rotated into face to face relationship with the other key-way 18, movable key 65 is moved outwardly into engagement with the other key-way 18 of tool T due to the force of the pressurized air. Accordingly, rotation of spindle 11 is transmitted through movable key 65 to tool T to forcibly rotate the same within tool gripper 13a of tool change arm 13.

Simultaneously, communication of passage 75 with passage 78 is discontinued, but instead communicates with passage 71, whereby pressurized air is supplied to pressure switch 74 to actuate the same. With pressure switch 74 being actuated and tool change arm 13 being moved to its upward end position, key engagement is confirmed. The confirmation of key engagement causes unclamping cylinder 24 to be deactivated to thereby release the urging force of drawing rod 22. Accordingly, tool T is clamped on spindle 11 by means of springs 23. Subsequently, tool change arm 13 is rotated back to its ready position, thereby completing the tool change operation. With the tool change operation being completed, the tool change command signal is cancelled so that switching circuit 86 renders a command signal from setting device 85 inoperative and a command signal from register 80 operative. Spindle 11 is thus rotated at a high speed depending upon a newly inserted tool for a next machining operation.

In the above-described embodiment, the tool change arm is used as a tool support device. However, the present invention can be applied to a machine tool wherein tools are directly changed between the tool magazine and the spindle. In such a case, the tool magazine is used as the tool support device.

As described above, according to the present invention, tool change operation is carried out while the spindle is rotated. Therefore, there is no need to provide a device to stop the spindle at a predetermined angular position, as in the conventional apparatus, whereby the required length of time for tool changing is considerably shortened, resulting in an increase of machining efficiency.

Furthermore, according to the present invention, a tool is removed from the rotating spindle in response to a signal confirming the predetermined angular position of the spindle, whereby the key-way of a tool returned from the spindle to the tool magazine is maintained at a substantially predetermined angular position. These arrangement and control are particularly effective for large sized tools.

Furthermore, according to the present invention, a tool is removed from the rotating spindle in response to a signal confirming one predetermined angular position of the spindle, and, for insertion of the tool into the spindle, the movable key is moved outwardly in response to a signal confirming another predetermined angular position of the spindle, whereby the movable key is continuously engaged with a predetermined key-way of the first and second key-ways of the tool. Accordingly, a taper engagement between the spindle and the tool is constantly maintained, resulting in an increase in machining accuracy.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A machine tool with an automatic tool change function having a tool spindle rotatably supported and capable of receiving a tool at one end thereof, comprising:

tool support means for rotatably supporting at least one tool having a first and second key-way formed thereon and for selective insertion and removal of said at least one tool into and from said spindle, respectively;

a movable key movably guided in said spindle and having a width smaller than that of said first and second key-ways formed on said tool;

control means responsive to a tool change command for rotating said spindle at a predetermined speed permitting key-engagement;

operating means for causing relative movement between said tool support means and said spindle for tool change operation with said spindle being rotated at said predetermined speed;

first means for confirming that said spindle has reached a first predetermined position during rotation thereof at said predetermined speed;

second means for confirming that said spindle has reached a second predetermined position during rotation thereof at said predetermined speed, wherein said operating means further comprises means responsive to said first confirming means for causing relative movement between said tool support means and said spindle in a direction parallel to the axis of said spindle to remove said at least one tool from said spindle; and means for withdrawing said movable key prior to insertion of said tool into said spindle and for moving said movable key outwardly into engagement with a predetermined key-way of said first and second key-ways in response to operation of said second confirming means.

2. A machine tool as claimed in claim 1, further comprising:

a tool magazine for removably supporting a plurality of said tools wherein said tool support means further comprises a tool change arm rotatable and movable in a direction parallel to the axis of said spindle and wherein said tool change arm further comprises at least one tool gripper capable of rotatably supporting said tool.

3. A machine tool as claimed in claim 1 or 2, further comprising means for slidably receiving said movable key in said spindle in such a manner as to form front and rear chambers; and wherein said means for withdrawing and moving further comprises:

a pressurized air supply source; and a solenoid valve means provided between said front and rear chambers and said pressurized air supply source for selectively supplying pressurized air to said front and rear chambers to thereby withdraw and advance said movable key relative to said spindle.

4. A machine tool as claimed in claim 3, further comprising a pressure switch actuatable when said movable key is engaged with said predetermined key-way.

* * * * *